(12) United States Patent
Leibenguth et al.

(10) Patent No.: US 11,433,696 B2
(45) Date of Patent: Sep. 6, 2022

(54) METHOD FOR GENERATING VARIABLE GUILLOCHE PATTERNS, IMPLEMENTING DEVICE AND IDENTIFICATION DOCUMENT COMPRISING SUCH PATTERNS

(71) Applicants: THALES DIS FRANCE SA, Meudon (FR); CENTRE NATIONAL DE LA RECHERCHE SCIENTIFIQUE, Paris (FR); UNIVERSITE JEAN MONNET SAINT ETTIENNE, Saint-Etienne (FR)

(72) Inventors: Joseph Leibenguth, Meudon (FR); Thierry Fournel, Saint-Etienne (FR); Dinu Coltuc, Saint-Etienne (FR)

(73) Assignee: THALES DIS FRANCE SA, Meudon (FR)

( * ) Notice: Subject to any disclaimer, the term of this patent is extended or adjusted under 35 U.S.C. 154(b) by 0 days.

(21) Appl. No.: 16/651,270

(22) PCT Filed: Oct. 1, 2018

(86) PCT No.: PCT/IB2018/057608
§ 371 (c)(1),
(2) Date: Mar. 26, 2020

(87) PCT Pub. No.: WO2019/064286
PCT Pub. Date: Apr. 4, 2019

(65) Prior Publication Data
US 2020/0223244 A1    Jul. 16, 2020

(30) Foreign Application Priority Data
Sep. 26, 2017   (EP) ..................... 17306265

(51) Int. Cl.
*B42D 25/337*   (2014.01)
*G06T 11/20*    (2006.01)
(Continued)

(52) U.S. Cl.
CPC .......... *B42D 25/337* (2014.10); *B42D 25/23* (2014.10); *B42D 25/24* (2014.10); *B42D 25/313* (2014.10);
(Continued)

(58) Field of Classification Search
CPC ...... B42D 25/337; B42D 25/23; B42D 25/24; B42D 25/313; G06T 11/203; G06T 1/005;
(Continued)

(56) References Cited

U.S. PATENT DOCUMENTS 4,557,596 A    12/1985  Mueller et al.
4,590,366 A *   5/1986  Rothfjell ................. G07F 7/086
                                                          235/494

FOREIGN PATENT DOCUMENTS

EP    2236308 A1   10/2010
EP    2325022 A1    5/2011
(Continued)

OTHER PUBLICATIONS

PCT/IB2018/057608, International Search Report, dated Feb. 22, 2019, European Patent Office, P.B. 5818 Patentlaan 2 NL—2280 HV Rijswijk.
(Continued)

*Primary Examiner* — Justin V Lewis
(74) *Attorney, Agent, or Firm* — The Jansson Firm; Pehr B. Jansson

(57) ABSTRACT

Generation of one dimensional guilloche patterns able to be affixed on a document, each guilloche pattern being able to encode variable alphanumeric data providing a different appearance to each guilloche pattern, by formatting alpha-
(Continued)

numeric data to be encoded in the form of a predefined number of data blocks with a predefined size, generating a carrier function having a plurality of parameters, the formatted data blocks forming at least one of the parameters, and modulating the carrier function by the formatted data blocks so as to encode the alphanumeric data graphically, each data block defining a guilloche pattern, the number of data blocks defining the number of guilloche patterns, the carrier function associated with a formatted data block is modulated locally, each datum of the block being encoded locally in the guilloche pattern, by interpolation of a predefined point associated with the carrier function.

27 Claims, 4 Drawing Sheets

(51) Int. Cl.
  *B42D 25/23* (2014.01)
  *B42D 25/24* (2014.01)
  *B42D 25/313* (2014.01)
  *G06T 1/00* (2006.01)
  *H04N 1/32* (2006.01)

(52) U.S. Cl.
  CPC ............ *G06T 1/005* (2013.01); *G06T 11/203* (2013.01); *H04N 1/3232* (2013.01); *H04N 1/32203* (2013.01); *G06T 2201/0052* (2013.01); *G06T 2201/0062* (2013.01); *G06T 2201/0065* (2013.01); *H04N 2201/3205* (2013.01)

(58) Field of Classification Search
  CPC ..... G06T 2201/0052; G06T 2201/0062; G06T 2201/0065; G06T 2201/0061; G06T 2201/0051; G06T 11/20; G06T 1/00; H04N 1/32203; H04N 1/3232; H04N 2201/3205; H04N 2201/3269; H04N 1/32208; H04N 1/32149; H04N 1/32
  USPC .............. 283/67, 70, 72, 73, 74, 94, 98, 901
  See application file for complete search history.

(56) References Cited

FOREIGN PATENT DOCUMENTS

| | | |
|---|---|---|
| WO | WO2007121726 A2 | 11/2007 |
| WO | WO2007121726 A3 | 11/2007 |
| WO | WO2010003948 A1 | 1/2010 |
| WO | WO2014060700 A1 | 4/2014 |

OTHER PUBLICATIONS

PCT/IB2018/057608, Written Opinion of the International Searching Authority, dated Feb. 22, 2019, European Patent Office, D-80298 Munich, Germany.

PCT/EP2018/075980, International Search Report, dated Dec. 7, 2018, European Patent Office, P.B. 5818 Patentlaan 2 NL—2280 HV Rijswijk.

PCT/EP2018/075980, Written Opinion of the International Searching Authority, dated Dec. 7, 2018, European Patent Office, D-80298 Munich, Germany.

* cited by examiner

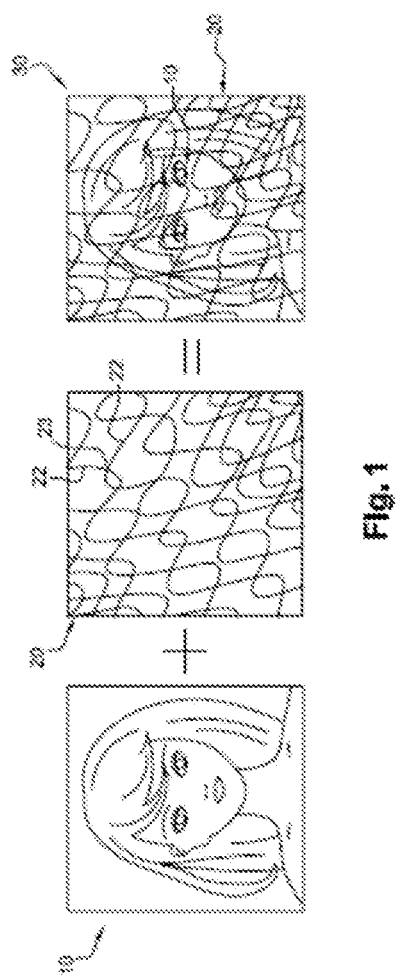

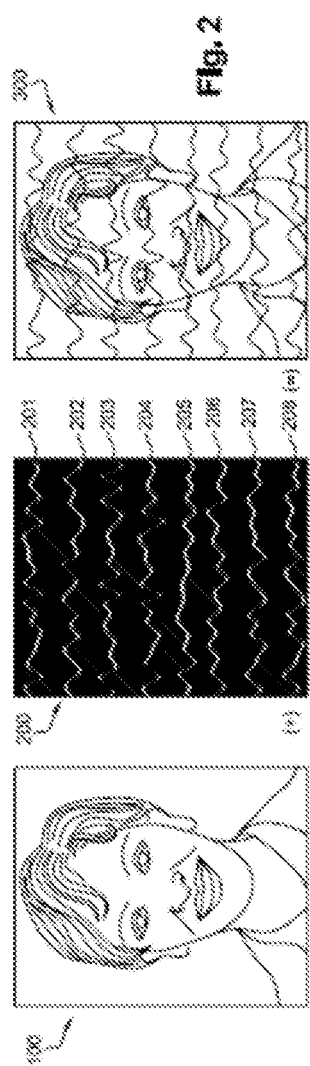
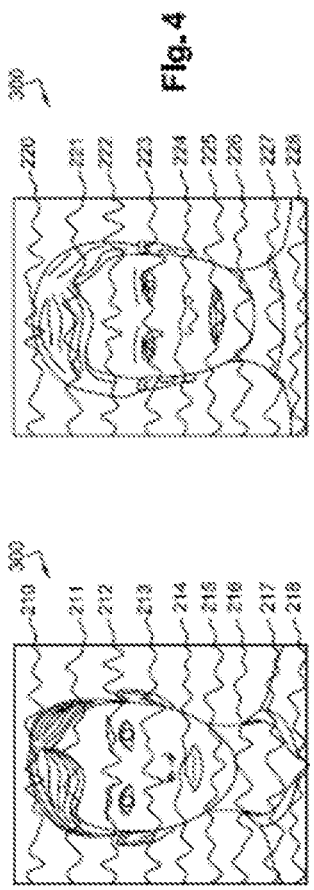
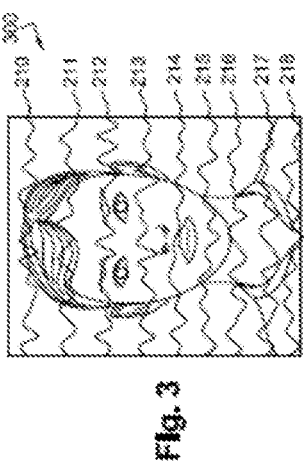

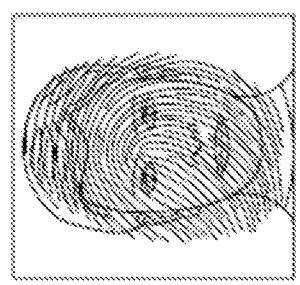
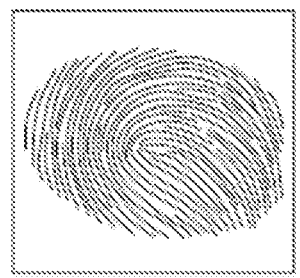
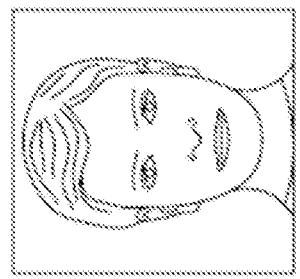
Fig. 6

METHOD FOR GENERATING VARIABLE GUILLOCHE PATTERNS, IMPLEMENTING DEVICE AND IDENTIFICATION DOCUMENT COMPRISING SUCH PATTERNS

TECHNICAL FIELD

The present invention relates to a method for generating guilloche patterns as well as a device for carrying out said method. It also relates to secure documents such as an identification card, a driver's license, a notarized deed, etc. The invention is applicable in the fields of securing documents such as identification papers.

BACKGROUND OF THE INVENTION

In a known manner, identification documents generally include an identification photograph of the holder as well as alphanumeric data, such as the holder's name, date of birth, height, address, the document number, the issue date of the document and/or the identity of the authority having issued the document.

In order to secure identification documents, it is known to associate the identification photograph with guilloches. These guilloches form a grid of wavy lines, superimposed on the photograph and visible to the naked eye. The guilloches are intended to make any fraudulent changes to the photograph discernible during an identity check. They in particular make it possible to protect against changes to the color of the photograph, for example by adding a beard or hair. Thus, guilloches generally make it possible to perform level 1 security checks (visual check by the naked eye) and/or level 2 security checks (visual check with a simple optical device such as a magnifying glass or an ultraviolet light).

Furthermore, it is also known to implement means for protecting alphanumeric data included on the identification documents in order to protect against alterations to said data, such as changes to said alphanumeric information.

The protection of the alphanumeric data can be obtained using watermarking techniques intended to incorporate elements that are not visible to the naked eye into an identification photograph, said elements encoding predefined information. Watermarking provides level 3 security (automatic verification of encoded data) during a security check. Thus, using a digital processing and analysis apparatus, the identification photograph is analyzed and the data watermarked therein are extracted. The consistency of these data is then checked.

However, watermarking has a certain number of drawbacks. Indeed, since it is not visible to the naked eye, watermarking does not make it possible to carry out level 1 or 2 security. Checking watermarked security documents therefore requires trained staff, equipped with substantial analysis resources, which limits security checks, in particular mobile checks. Furthermore, watermarks may prove sensitive to deterioration of the identification document, deterioration that may be caused, during the validity period of the document, by natural wear, exposure to UV rays, lack of care by the holder, etc. The analysis of deteriorated watermarks may then result in an erroneous reading of the watermarks, or an inability to read them during the inspection.

A technique based on guilloches has also been developed to secure the alphanumeric data included on identification documents. This technique proposes to insert, on the identification photograph, variable guilloches encoding all or some of the alphanumeric data. Examples of methods for securing documents using such variable guilloches are in particular described in patent applications EP 2,325,022 A1 and US 2010/0260372, filed in the applicant's name. These variable guilloches generally comprise a set of guilloche lines or a 2D model whereof the spacing and/or the intersection between guilloche lines and/or the thickness of said guilloche lines are variable. These guilloche lines are therefore connected to one another by visible links in the photograph. FIG. 1 shows an example photograph 10, an example of two-dimensional (or 2D) guilloches of the prior art, referenced 20, as well as a secure photograph 30 resulting from the combination of the photograph 10 and guilloches 20. The links 23 between the various guilloche lines 22 of the guilloches 20, associated with the guilloche lines 22, which may potentially be close together and/or thick, have a negative effect on the visual perception of the underlying content of the document, in particular of the photograph. Indeed, as shown by the secure photograph 30 of FIG. 1, this type of 2D guilloche hinders the visual perception of the photograph and prevents good readability of the characteristic traits of the holder of the secure document. This visual perception flaw prevents the implementation of level 1, or even level 2, security, which causes the previously described drawbacks of an implementation of level 3 security alone.

BRIEF DESCRIPTION OF THE INVENTION

In order to respond to the above-mentioned problem of protecting alphanumeric data able to be checked only using a level 3 security device, the applicant proposes to format the alphanumeric data in the form of a matrix modulating one or several carrier functions, so as to generate guilloche patterns not hindering the visual perception of the photograph.

According to a first aspect, the invention relates to a method for generating 1D guilloche patterns able to be affixed on a document, each guilloche pattern being able to encode alphanumeric data providing a variable appearance to each guilloche pattern, the method comprising the following operations:

formatting alphanumeric data to be encoded in the form of a predefined number of data blocks with a predefined size;

generating, per block, at least one carrier function comprising a plurality of parameters, the formatted data blocks forming at least one of the parameters; and modulating the carrier function by the formatted data blocks so as to encode the alphanumeric data graphically, each data block defining a guilloche pattern, the number of data blocks defining the number of guilloche patterns, and the carrier function associated with a formatted data block is modulated locally, each datum of the block being encoded locally in the guilloche pattern, by interpolation of a predefined point associated with the carrier function.

This method makes it possible to generate guilloche patterns that encode alphanumeric data so as to secure the document, but that do not visually disrupt the reading of the document on which they are affixed.

This method may apply to all sorts of secure documents. It may in particular apply to:
- identification documents such as identification cards, passports, driver's licenses, etc., where the guilloche patterns are generally applied on the holder's photograph,
- secure documents with or without photographs, such as public records, notarized deeds (also called breeder documents) or mobile IDs, where the entire document contains guilloche patterns, or
- brand protection documents or other physical markings (for example packaging or luxury objects) for which authentication of the origin is desired.

Advantageously, the formatting is obtained by applying a cryptographic hash function, which, aside from detecting changes, makes it possible both to decorrelate data and control the size of said data to be encoded.

According to certain embodiments intended to authenticate the data management source, the hash function is configured by a key or combined with a digital signature so as to reinforce the security within an infrastructure.

According to certain embodiments intended to have data checked by a trusted third party, the generation of the carrier function(s) is obtained by applying generating rules specific to the data management source. This carrier generation may be of steganographic or cryptographic origin, depending on the level implemented upon inspection.

According to one or several embodiments, the carrier function associated with a formatted data block is modulated locally, each datum of the block being encoded locally in the guilloche pattern, by interpolation of a predefined point associated with the carrier function that has been subjected beforehand to a quantified displacement.

The carrier function may be a sine function and each datum of the formatted data block may be encoded by a quantified displacement of the extremum of the sine that is associated with it.

According to one alternative, each carrier function may have a sinusoidal appearance with a variable amplitude and be defined by an interpolation function as well as a set of interpolation points intended to be moved along the formatted data block to be encoded.

Whether the carrier functions are sinusoidal or sinusoidal with a variable amplitude, they have frequencies comprised in a predetermined frequency band, deemed visually acceptable.

According to another alternative, when the document intended to receive the guilloche patterns is a security document, the interpolation defining the carrier frequencies may be done from grooves (or furrows) corresponding to a fingerprint of the holder of the security document.

According to one or several embodiments, the carrier function associated with a formatted data block is modulated globally, all of the data of the block being encoded globally in the guilloche pattern, using a spread spectrum approach.

The carrier function can be built by a linear combination in a wavy functions base belonging to a band of predefined frequencies, and the data from the block of formatted data can be encoded by adjusting the weights of the linear combination.

The wavy functions may be cosine or sine functions corresponding to a bandwidth preselected in a domain of the Discrete Cosine transform.

According to certain embodiments, the method comprises an operation for detecting and correcting encoding errors of the formatted data.

According to certain embodiments, the method comprises an operation for accentuating differences in appearance of the guilloche patterns by specific processing of said guilloche patterns in an image plane. These embodiments make it possible to encode not only alphanumeric data, but also the fingerprint of the holder, thus offering increased security of the identification document.

According to certain embodiments, the carrier function is partly globally modulated and partly locally modulated.

According to a second aspect, the invention relates to a device for generating guilloche patterns including a computer containing a set of instructions that lead said computer to carry out the method for generating guilloche patterns previously defined.

According to a third aspect, the invention relates to an identification document comprising an identification photograph and alphanumeric data relative to the holder, the identification photograph visibly comprising guilloche patterns generated by the method defined above, said guilloche patterns encoding formatted data, collected from alphanumeric data relative to the holder.

According to one embodiment, the guilloche patterns affixed on the photograph are perceptually constrained.

BRIEF DESCRIPTION OF THE FIGURES

Other advantages and features of the invention will appear upon reading the description, illustrated by the figures, in which:

FIG. 1, already described, shows an example of an identification photograph on which 2D guilloche patterns according to the prior art are overprinted;

FIG. 2 shows an example of an identification photograph on which 10 guilloche patterns according to the invention are overprinted;

FIGS. 3, 4 and 6 show other examples of guilloche patterns according to the invention overprinted on identification photographs.

DETAILED DESCRIPTION OF AT LEAST ONE EMBODIMENT OF THE INVENTION

Figure 5:
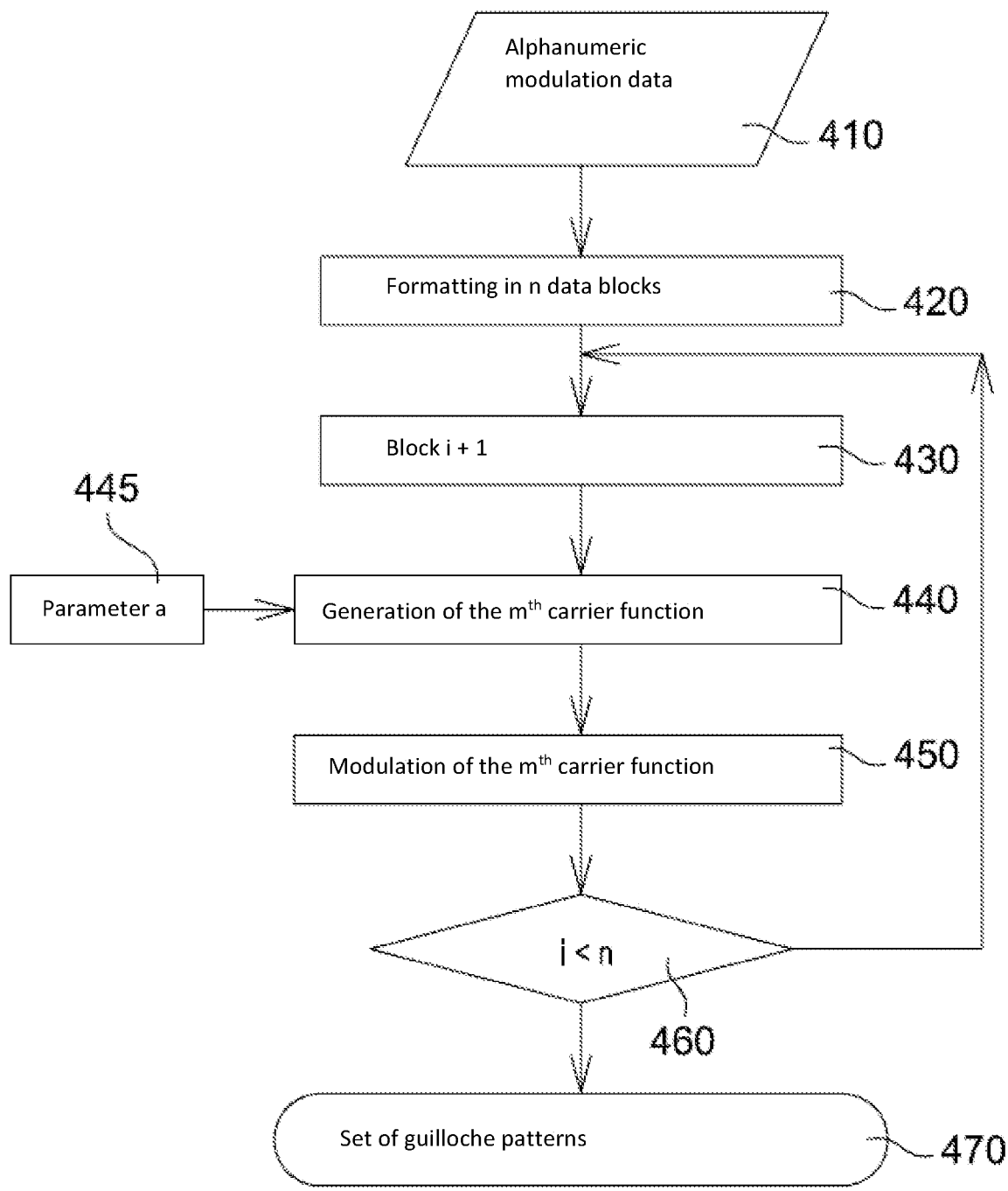
FIG. 5 shows a block diagram of an example method according to the invention.

One example embodiment of a method for generating 1D guilloche patterns, with an acceptable visual prominence, is described in detail below, in reference to the appended drawings. This example illustrates the features and advantages of the invention. It is, however, recalled that the invention is not limited to this example.

In the figures, the identical elements are identified using identical references. For legibility of the figures, the illustrated elements are not shown to scale.

The method according to the invention proposes to generate guilloche patterns to be inserted on a portion or all of a secure document like those previously cited. In the description that follows, the method will be described when it is applied to a portion of a secure document, such as a photograph, on which guilloche patterns, also called guilloches, are superimposed. One skilled in the art will understand that the method as it will be described may also be implemented for a document for which all of said document comprises guilloche patterns. These guilloche patterns are for example one-dimensional patterns, or 1D guilloche patterns, suitable for encoding alphanumeric data such as the personal data of the holder included on the security document. Each 1D guilloche pattern assumes the form of a variable wavy line, visible to the naked eye on underlying content, and in particular on a photograph, but the visual prominence of which is mild enough not to disrupt the visual perception of said underlying content, i.e., the content of the document positioned below the guilloche patterns.

An example of a set 200 of guilloche patterns 201-208 is shown in FIG. 2. This FIG. 2 also shows an example of a photograph 100 on which the set of guilloche patterns 200 is superimposed to form a secure photograph 300. Other examples of photographs with superimposed guilloche patterns are shown in FIGS. 3 and 4. As shown by the secure photographs 300, the guilloche patterns 201-228 vary greatly. They are also not very prominent, relative to the guilloche patterns of the prior art, which makes it possible not to visually disrupt the main features of the figure in the photograph 100. In other words, the prominence of the guilloche patterns on the underlying content is limited so as not to draw the inspector's attention to the guilloches.

As shown in FIGS. 2, 3 and 4, the guilloche patterns 201-228, also called guilloches, are sets of lines, respectively referenced 201-208, 210-218 and 220-228, which are wavy and irregular, and the irregularities of which correspond to encoded data, if applicable partly to the carriers. In the example of FIG. 2, the guilloche patterns for example encode the following data: Anna THOMSON 021171 2004444521947 6734 Y54A.

An example method according to the invention is shown in FIG. 5. This method comprises a preliminary step 420 for formatting alphanumeric data 410 to be encoded. Indeed, in order to allow the encoding of data within the guilloche patterns, the alphanumeric data to be encoded 410, for example the alphanumeric data mentioned on an identification document, are first formatted, or conditioned, in the form of a matrix of a predetermined number n of data blocks each comprising a predefined number m of bits. In one embodiment, the conditioning of the data is done using a cryptographic hash function. Hashing is a calculated division of the alphanumeric data shaped in a binary matrix of n data blocks of m bits. This hashing allows a decorrelation of the data, which has a favorable effect on the prominence level of the generated guilloche patterns, i.e., which makes it possible to limit the prominence of said guilloche patterns on the underlying content. Hashing further allows mastery of the size of the data with respect to the encoding capacity of each guilloche pattern. For example, a hash value encoded on 160 bits may be encoded according to n=10 rows (or guilloche patterns) each encoding m=16 bits.

According to certain embodiments, the hashing is configured by a private key or implemented in the context of a digital signature mechanism so as to reinforce the security within a public key infrastructure.

The use of a hash (with or without a key) has the interest of providing, at the input of the operation for generating guilloche patterns, a fixed-size vector irrespective of the size and/or volume of the alphanumeric data to be encoded. Furthermore, the random nature of the hash reinforces the variability of the guilloche patterns in all of the guilloche patterns superimposed on the underlying content.

According to some embodiments, at least some of the alphanumeric data to be formatted may include some or all of a biometric-type code, optionally lossless compression. Thus, in the context of securing an identification document, it may be advantageous in order to guarantee the identification of its holder, its issuer, respectively, to consider, among the alphanumeric data, a fingerprint of the holder and/or the medium of the document (substrate and/or electronic chip making up the physical document), able to be checked simultaneously using dedicated readers.

The n data blocks formatted in the manner described above are next used to modulate a carrier function or n carrier functions. Indeed, the method according to the invention comprises, after the operation for formatting 420 the alphanumeric data, an operation 440 consisting of generating, if applicable by formatted data block, a carrier function comprising a plurality of parameters 4 (operation 445 for choosing parameters a). Each carrier function, graphically represented by a wavy curve, has the explicit form $y=f(x, a, b)$, where $(x, y)$ is a pair of local coordinates, in a Cartesian system or any other appropriate system, where a represents the parameters of the carrier function and where b represents the parameters making it possible to vary said carrier function, typically one of the n formatted data blocks. In other words, each formatted data block modulates the carrier function so as to generate a guilloche pattern, i.e., a guilloche line of the type shown by references 201-208 in FIG. 2. If the parameter a is constant, the carrier is the same for the n formatted data blocks, which therefore modulate this carrier function n times so as to generate n guilloche patterns, these n concatenated guilloche patterns forming the set 200 of guilloche patterns, or an image to be applied on a document to be secured, and in particular a photograph. Thus, each formatted data block defines a guilloche pattern and the number of formatted data blocks defines the number of guilloche patterns of a set.

In the example of FIG. 5, each block i—with i varying from 0 to n—is incremented from 1 in step 430 such that each of the n data blocks in turn modulates the carrier function $y=f(x, a, b)$, to step 450, in order to generate a guilloche pattern. When the n data blocks have modulated the carrier function (step 460), the set 200 of guilloche patterns is generated (step 470).

According to certain embodiments, the carrier function is modulated locally. The formatted data of a data block are then encoded locally, i.e., datum by datum, on a guilloche line. The local modulation may be implanted using an interpolation approach. In this approach, the carrier functions are built by interpolating predefined points using an interpolation function. The predefined points are remarkable points of the wavy curve corresponding to the carrier function, called interpolation points.

In local modulation, the formatted data are encoded by displacing interpolation points in an image plane. According to one embodiment, the x-axes of the interpolation points are equidistant, the sign of their y-axes alternating and '0's being inserted in between. In this way, a symmetrical interpolation kernel (for example, a cubic spline function for a truncated Gaussian) leads to wavy guilloche patterns, the extrema of which are the interpolation points. In this embodiment, the encoding of a bit at '1' at an extremum of the current guilloche line is done for example by moving this extremum vertically by a predefined quantity, without the adjacent extrema being modified. The expression "vertical displacement" refers to a displacement along the y-axis, with the understanding that this axis of the amplitude is perpendicular to the x-axis.

The local modulation is done in a limited frequency band, which satisfies the perpetual constraint of a mild visual prominence (lines with limited local slope) while transmitting a secure nature (irregular nature of the lines).

According to certain embodiments, the carrier function is modulated globally. The formatted data of a data block are then encoded globally through an entire guilloche line.

The global modulation may be implanted using a spread spectrum approach. In this approach, the carrier functions may be built by linear combination in a wavy functions base belonging to a predefined frequency band, by setting the weights to 1 in this band. The formatted data are encoded by adjusting the weights of the linear combination. According to one embodiment, the basic functions are Cosine or Sine functions corresponding to the bandwidth preselected in the domain of the Discrete Cosine transform. The encoding of a formatted data block in a current guilloche line is then done by adjusting the sign of the weight of each sine component according to the corresponding bit in the data block (the weight is switched to −1 if the data bit is 1, the weight stays at 1 if the data bit is at 0). If, like in the case of the discrete cosine transform, the transform is reversible, this adjustment may be done in the domain of the transform in order to obtain the guilloche pattern by reverse transform.

In certain embodiments, the formatted data from several data blocks are encoded in a same guilloche pattern. An apodization window raised to the power may be used in order to cause a more or less rapid regular decrease at the ends of the curve, which allows a potential connection of several curves in the case of several data blocks to be encoded in a same guilloche pattern.

The global modulation has the advantage of allowing partial masking of a guilloche line, for example when the guilloche pattern is superimposed on a multicolored zone of a photograph. Indeed, up to about 30% of a hidden guilloche pattern can be detected and extracted when the data are encoded with a global modulation.

The local modulation and the global modulation previously described may be combined within a same set of guilloche patterns.

Irrespective of the chosen type of modulation (local and/or global modulation), the set of generated guilloche patterns is superimposed on the document or on the part of the document to be secured, as shown in FIGS. 2 to 4, such that said document or document part is traveled over by several guilloche patterns with a mild visual prominence that does not disrupt the readability of the document or document part. The document or document part thus contains guilloche patterns encoding alphanumeric data that guarantee at least partial security of said document or document part.

According to certain embodiments, the n data may be encoded during formatting, in n code words belonging to a code detecting and correcting errors (such as a cyclic redundancy code [CRC] or Reed-Solomon code) or error packets (such as a cross-interleaved Reed-Solomon code [CIRC code]). Such encoding makes it possible to provide rereading of the data under deteriorated conditions, with a low signal-to-noise ratio. Such encoding can be carried out in each of the modulations or the combination thereof.

In certain embodiments, in particular when the document is a security document, the carrier function can be all of the grooves (or furrows) of a fingerprint of the holder of the security document. An example of a photograph secured by guilloche patterns obtained from the fingerprint of the holder is shown in FIG. 7. Indeed, the grooves of the fingerprint can be described in the form of parametric curves. To that end, each groove may in particular be sampled using a set of m+2 interpolation points selected on the groove, $P_i=(x_i,y_i)$, with which the values $t_i$ are associated, lengths of the broken lines $P_0, P_1, \ldots, P_i$ of the parameter t intended to describe the curve in the interval [0,L] where L represents the length of the broken line $P_0, P_1, \ldots P_{m+2}$. The coordinates x, respectively y, can be obtained explicitly using a cubic cumulative parametric spline s: $x(t)=s(t,\{t_i,x_i\})$ (respectively $y(t)=s(L\{t_i,y_i\})$). It is then each of the m interpolation points $P_i$ of the grooves (i=1, ..., m) that are individually moved by a predetermined distance, for example along the normal to the groove in $P_i$, along the ith datum $b_i$ of the current block b to be encoded during the local modulation step. In this way, the document is secured not only by the guilloche patterns encoding data specific to the holder and/or the issuer, but also the fingerprint of the holder.

The method previously described makes it possible to obtain variable 1D guilloche patterns, i.e., with the ability to support personal data while having an appearance fluctuating visually from one pattern to another, acceptable with respect to the underlying content. The diversification of the guilloche patterns from one document to another may further be accentuated through specific processing, for example by introducing a tendency that is not necessarily affine for each of the guilloche patterns. If needed, grids, for example with a rectangular or triangular mesh, may easily be formed by combination using an inclusive-OR, of sets of guilloche patterns obtained according to the invention after having oriented them appropriately.

The use of horizontal and/or vertical offsets as a ruler for arranging guilloche patterns making up the sets may be used for inspection by a trusted third party. For example, a particular alternating arrangement of guilloche patterns starting on a rising edge, falling edge, respectively, may be usable at level 1 by the inspectors.

During the customization phase of identification documents and according to certain embodiments, the sets of guilloche patterns thus generated may ultimately be conditioned and colored before being inserted, in particular in terms of the identification photograph or the background if it is at least partially variable. This method thus provides the opportunity to insert personal data and/or characteristics of physical components with the aim of preventing an attack by substitution and the ex nihilo creation of forged documents.

Although it has been described through a certain number of examples, alternatives and embodiments, the method for generating guilloche patterns according to the invention includes various alternatives, changes and improvements that will be obvious to one skilled in the art, with the understanding that these alternatives, changes and improvements are within the scope of the invention.

The invention claimed is:

1. A method for generating a set of guilloche patterns consisting of a plurality of one-dimensional guilloche patterns able to be affixed on a document, each one-dimensional guilloche pattern assumes a variable wavy line form, each guilloche pattern being able to encode alphanumeric data providing a variable appearance to each guilloche pattern, the method comprising:

formatting alphanumeric data to be encoded into a predefined number of formatted data blocks each having a plurality of datum and being of a predefined size;

generating, per formatted data block, at least one carrier function comprising a plurality of parameters, including at least one parameter selected from the formatted data blocks; and modulating the carrier function by the formatted data blocks so as to encode the alphanumeric data graphically, each formatted data block defining a guilloche pattern, the number of formatted data blocks defining the number of one-dimensional guilloche patterns in the set of one-dimensional guilloche patterns, and the carrier function associated with a formatted data block is modulated locally, each datum of the block being encoded locally in the guilloche pattern, by interpolation of a predefined point associated with the carrier function.

2. The method for generating guilloche patterns according to claim 1, wherein the formatting is obtained by applying a cryptographic hash function.

3. The method for generating guilloche patterns according to claim 2, wherein the hash function is configured by a key or combined with a digital signature.

4. The method for generating guilloche patterns according to claim 1, wherein the carrier function is a sine function and each datum of the formatted data block is encoded by a quantified displacement of an extremum of the sine that is associated with aid each datum of the formatted data block.

5. The method for generating guilloche patterns according to claim 1, wherein the carrier function has a sinusoidal appearance with a variable amplitude, said carrying function being defined by an interpolation function and a set of interpolation points able to be moved along the formatted data block to be encoded.

6. The method for generating guilloche patterns according to claim 1, wherein the carrier function has frequencies comprised in a predetermined frequency band.

7. The method for generating guilloche patterns according to claim 1, wherein the interpolation defining each carrier function is done from grooves of a fingerprint of a holder of the document.

8. The method for generating guilloche patterns according to claim 1, wherein the carrier function associated with a formatted data block is modulated globally, all of the data of said block being encoded globally in the guilloche pattern, using a spread spectrum approach.

9. The method for generating guilloche patterns according to claim 8, wherein the carrier function is built by a linear combination in a wavy functions base belonging to a band of predefined frequencies, the data from the block of formatted data being encoded by adjusting weights of the linear combination.

10. The method for generating guilloche patterns according to claim 9, wherein the wavy functions are cosine or sine functions corresponding to a bandwidth preselected in a Discrete Cosine transform domain.

11. The method for generating guilloche patterns according to claim 1, further comprising an operation for detecting and correcting encoding errors of the formatted data.

12. The method for generating guilloche patterns according to claim 1, further comprising an operation for accentuating differences in appearance of the guilloche patterns by specific processing of said guilloche patterns in an image plane.

13. The method for generating guilloche patterns according to claim 1, wherein the carrier function is partially globally modulated and partially locally modulated.

14. A device for generating guilloche patterns consisting of a plurality of one-dimensional guilloche patterns comprising:
   a computer programmed with a set of instructions that direct said computer to carry out a method for generating guilloche patterns, each one-dimensional guilloche pattern assumes a variable wavy line form, the set of instructions including instructions to:
      format alphanumeric data to be encoded in a predefined number of formatted data blocks each having a plurality of datum and being of a predefined size;
      generate, per block, at least one carrier function comprising a plurality of parameters, including at least one parameter selected from the formatted data blocks; and
      modulate the carrier function by the formatted data blocks so as to encode the alphanumeric data graphically, each data block defining a guilloche pattern, the number of data blocks defining the number of guilloche patterns, and
      the carrier function associated with a formatted data block is modulated locally, each datum of the block being encoded locally in the guilloche pattern, by interpolation of a predefined point associated with the carrier function.

15. The device of claim 14, wherein the formatting is obtained by applying a cryptographic hash function.

16. The device of claim 15, wherein the hash function is configured by a key or combined with a digital signature.

17. The device of claim 14, wherein the carrier function is a sine function and each datum of the formatted data block is encoded by a quantified displacement of an extremum of the sine that is associated with said each datum of the formatted data block.

18. The device of claim 14, wherein the carrier function has a sinusoidal appearance with a variable amplitude, said carrying function being defined by an interpolation function and a set of interpolation points able to be moved along the formatted data block to be encoded.

19. The device of claim 14, wherein the carrier function has frequencies comprised in a predetermined frequency band.

20. The device of claim 14, wherein the interpolation defining each carrier function is done from grooves of a fingerprint of a holder of the document.

21. The device of claim 14, wherein the carrier function associated with a formatted data block is modulated globally, all of the data of said block being encoded globally in the guilloche pattern, using a spread spectrum approach.

22. The device of claim 21, wherein the carrier function is built by a linear combination in a wavy functions base belonging to a band of predefined frequencies, the data from the block of formatted data being encoded by adjusting weights of the linear combination.

23. The device of claim 22, wherein the wavy functions are cosine or sine functions corresponding to a bandwidth preselected in a Discrete Cosine transform domain.

24. The device of claim 14, wherein the set of instructions further include instructions to detect and correct encoding errors of the formatted data.

25. The device of claim 14, further comprising instructions to perform an operation for accentuating differences in appearance of the guilloche patterns by specific processing of said guilloche patterns in an image plane.

26. The device of claim 14, wherein the carrier function is partially globally modulated and partially locally modulated.

27. An identification document comprising an identification photograph and alphanumeric data relative to a holder of the identification document, wherein the identification photograph visibly comprises guilloche patterns consisting of a plurality of one-dimensional guilloche patterns encoding formatted data, collected from alphanumeric data relative to the holder, each guilloche pattern being able, itself, to encode alphanumeric data ensuring a variable aspect to each guilloche pattern, said guilloche patterns generated by:

formatting alphanumeric data to be encoded in a predefined number of formatted data blocks each having a plurality of datum and being of a predefined size;

generating, per block, at least one carrier function comprising a plurality of parameters, including at least one parameter selected from the formatted data blocks; and modulating the carrier function by the formatted data blocks so as to encode the alphanumeric data graphically, each data block defining a guilloche pattern, the number of data blocks defining the number of guilloche patterns, and the carrier function associated with a formatted data block is modulated locally, each datum of the block being encoded locally in the guilloche pattern, by interpolation of a predefined point associated with the carrier function.

* * * * *